US012215544B2

(12) United States Patent
Kim et al.

(10) Patent No.: US 12,215,544 B2
(45) Date of Patent: Feb. 4, 2025

(54) ROLLER BLIND DRIVE DEVICE PREVENTING ACCIDENT DUE TO DRIVE CORD

(71) Applicant: STS C&B. CO., LTD., Daegu (KR)

(72) Inventors: Sangik Kim, Daegu (KR); Changsik Jeon, Daegu (KR)

(73) Assignee: STS C&B. CO., LTD., Daegu (KR)

( * ) Notice: Subject to any disclaimer, the term of this patent is extended or adjusted under 35 U.S.C. 154(b) by 286 days.

(21) Appl. No.: 17/871,079

(22) Filed: Jul. 22, 2022

(65) Prior Publication Data

US 2023/0383597 A1 Nov. 30, 2023

(30) Foreign Application Priority Data

May 31, 2022 (KR) ........................ 10-2022-0066847

(51) Int. Cl.
*E06B 9/78* (2006.01)
*E06B 9/42* (2006.01)
*E06B 9/90* (2006.01)

(52) U.S. Cl.
CPC .................. *E06B 9/42* (2013.01); *E06B 9/78* (2013.01); *E06B 9/90* (2013.01)

(58) Field of Classification Search
CPC ........ E06B 9/42; E06B 9/78; E06B 2009/785; E06B 9/50; E06B 9/40; E06B 9/56
See application file for complete search history.

(56) References Cited

U.S. PATENT DOCUMENTS 11,591,851 B1 * 2/2023 Chou ........................ E06B 9/42
2006/0048907 A1 * 3/2006 Rice ........................ E06B 9/322 160/178.1 V
2011/0185540 A1 * 8/2011 Nevins .................... F16G 11/00 24/115 F
2012/0160431 A1 * 6/2012 Cannaverde ............ E06B 9/326 160/340

(Continued)

FOREIGN PATENT DOCUMENTS

CA 2951088 C 4/2017
CA 3050759 A1 * 6/2018 ............. E06B 9/326

(Continued)

OTHER PUBLICATIONS

Machine translation KR20120007976 (Year: 2012).*

(Continued)

*Primary Examiner* — Johnnie A. Shablack
*Assistant Examiner* — Jeremy C Ramsey
(74) *Attorney, Agent, or Firm* — NKL Law; Jae Youn Kim

(57) ABSTRACT

Proposed is a roller blind drive device preventing an accident due to a drive cord, the drive device being configured to lower or raise a curtain fabric by performing forward/reverse rotation of a drum on which the curtain fabric is wound, the drive device including a fixed part, a rotating part mounted rotatably to the fixed part and configured to perform the forward/reverse rotation of the drum, a circular drive cord having a front cord and a rear cord, and a manipulating part connected to the drive cord exposed to the lower side of the fixed part. Accordingly, the drive cord is covered so as not to be seen from the outside, and any one drive cord of the two drive cords is held by the rotating manipulation of the manipulation tube.

12 Claims, 13 Drawing Sheets

(56) References Cited

U.S. PATENT DOCUMENTS

| | | | | |
|---|---|---|---|---|
| 2023/0228147 A1* | 7/2023 | Derk, Jr. | E06B 9/42 160/321 |
| 2023/0235626 A1* | 7/2023 | Barkun | E06B 9/322 24/116 R |
| 2023/0313607 A1* | 10/2023 | Ng | E06B 9/326 160/321 |

FOREIGN PATENT DOCUMENTS

| | | | | |
|---|---|---|---|---|
| EP | 3152382 B1 | | 3/2018 | |
| KR | 2020070003254 Y1 | | 4/2008 | |
| KR | 20120007976 U | * | 11/2012 | |
| KR | 10-2014-0111596 A | | 9/2014 | |
| KR | 102077404 B1 | | 2/2020 | |
| WO | WO-2024007579 A1 | * | 1/2024 | E06B 9/78 |

OTHER PUBLICATIONS

Machine translation WO2024007579 (Year: 2024).*
Office Action of ISEDC for Canadian application No. 3,168,397, issued on Oct. 12, 2023.
KIPO Office Action for KR 10-2022-0066847, issued on Sep. 23, 2022.

* cited by examiner

【FIG. 1】
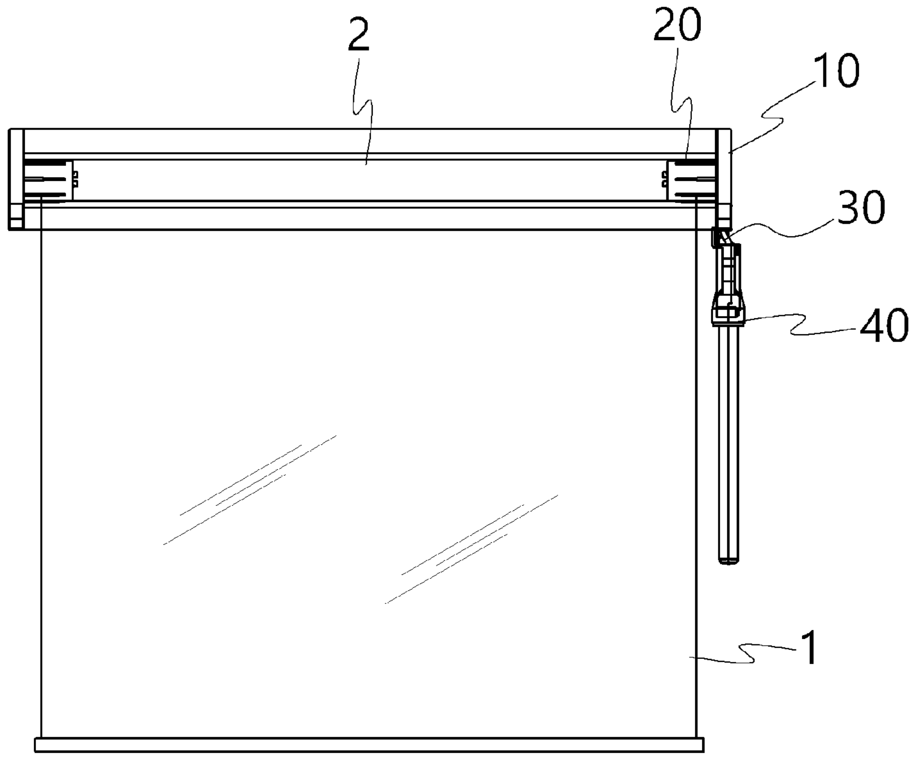

【FIG. 2】
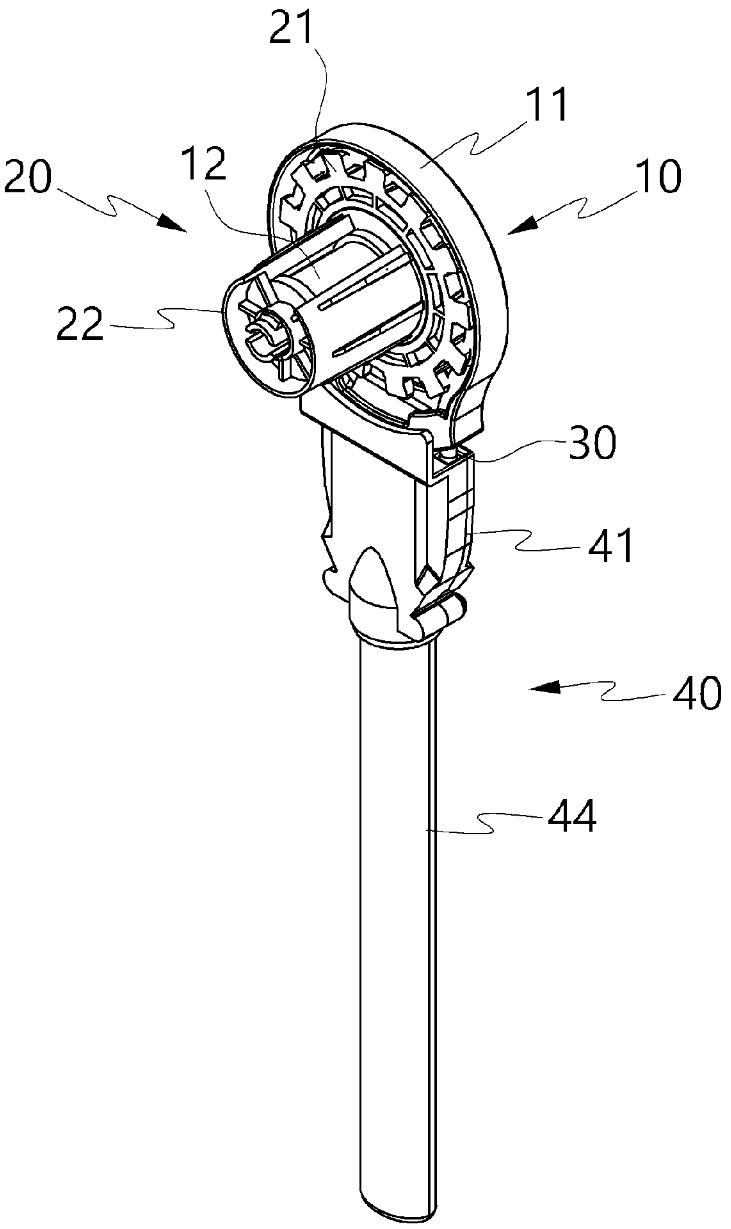

【FIG. 3】
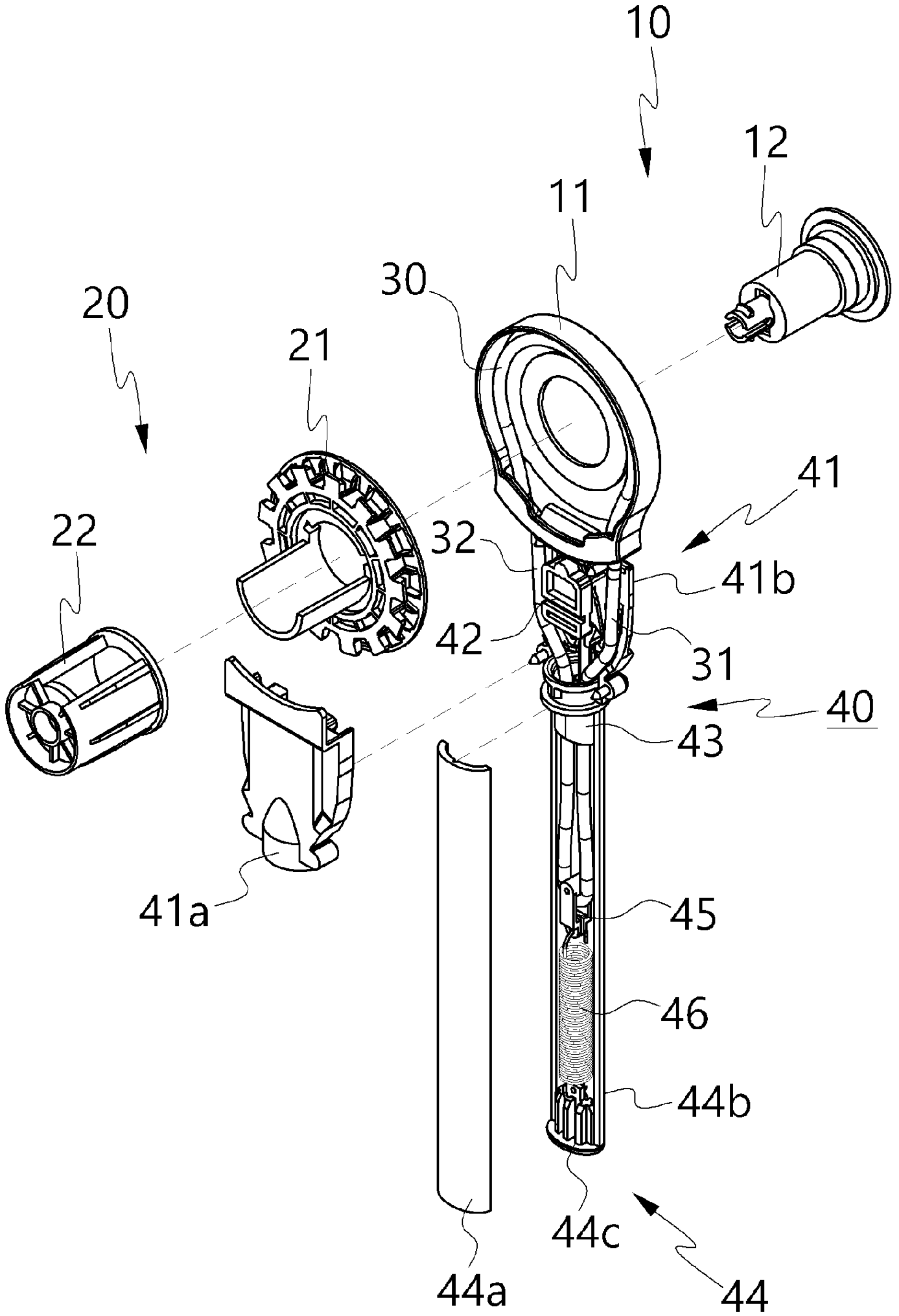

【FIG. 4】
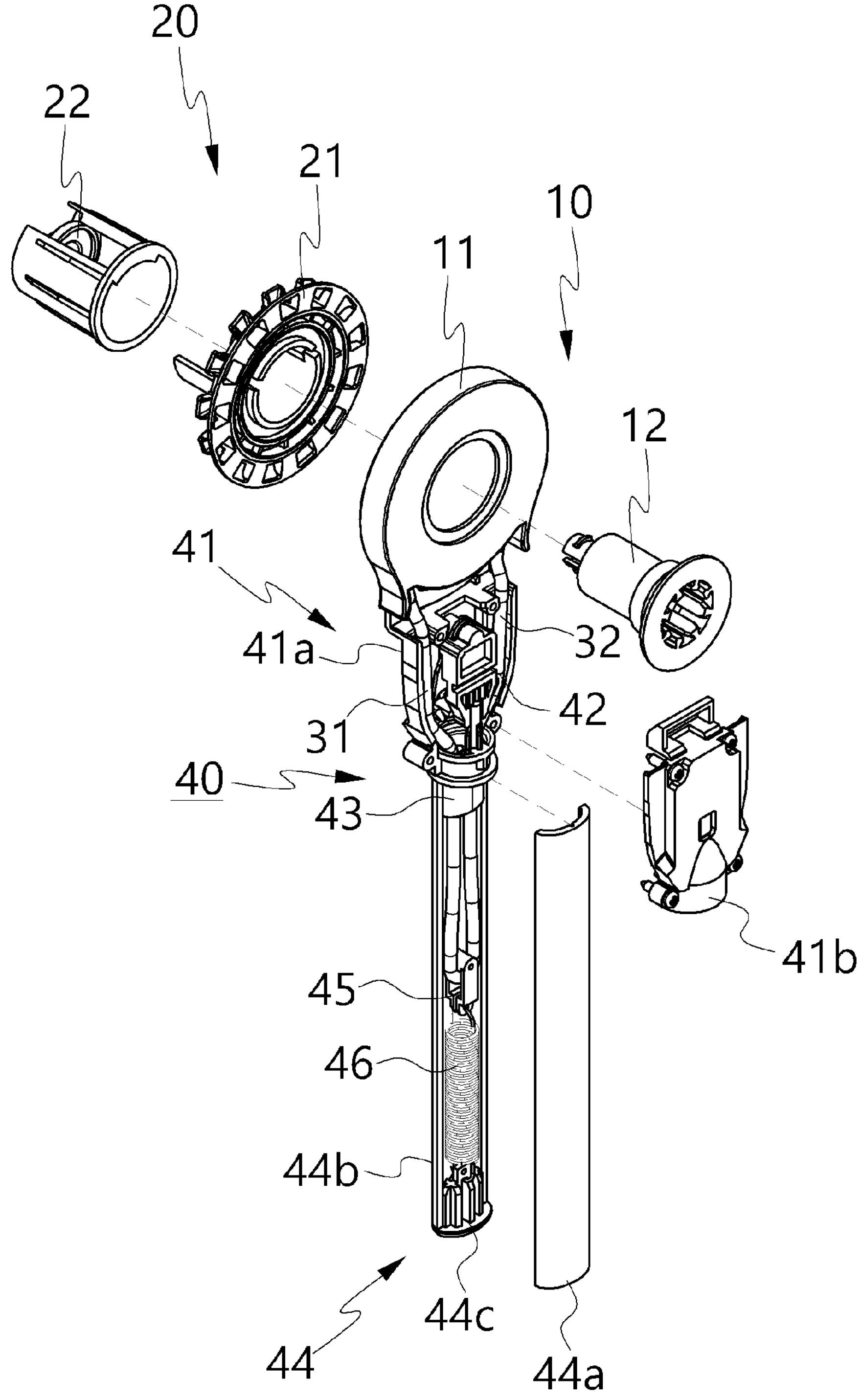

【FIG. 5】
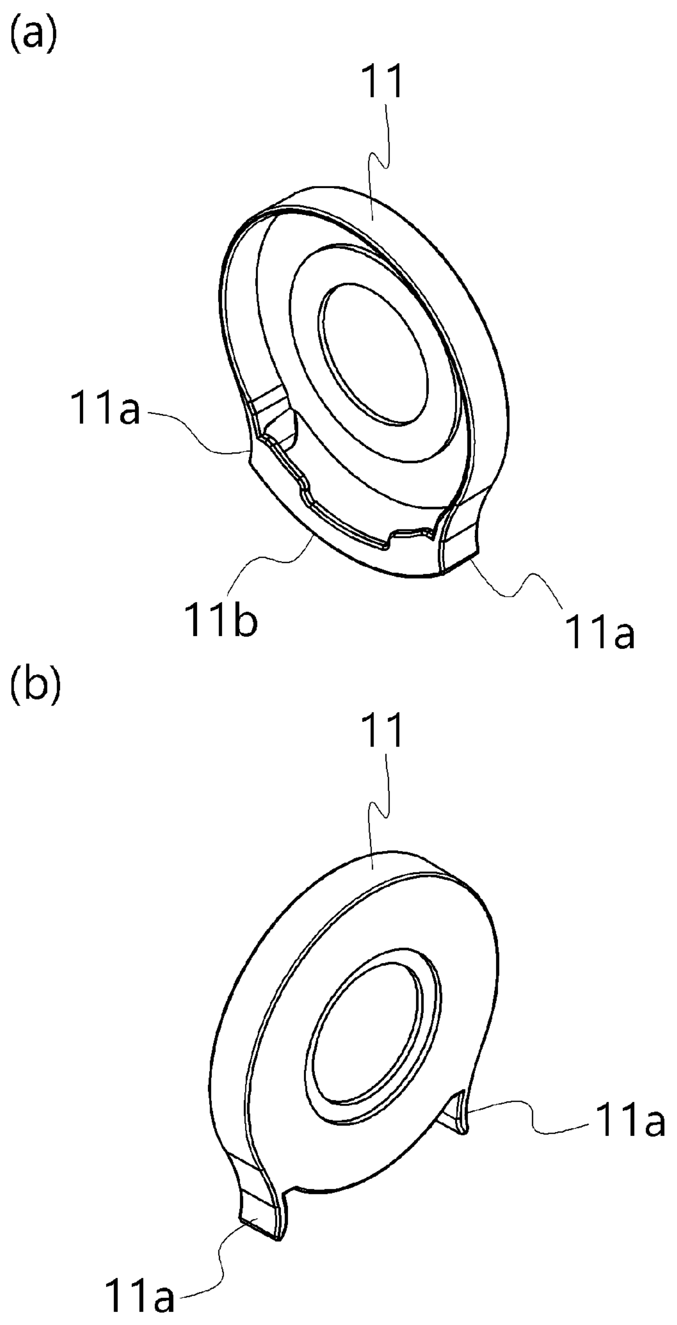

【FIG. 6】
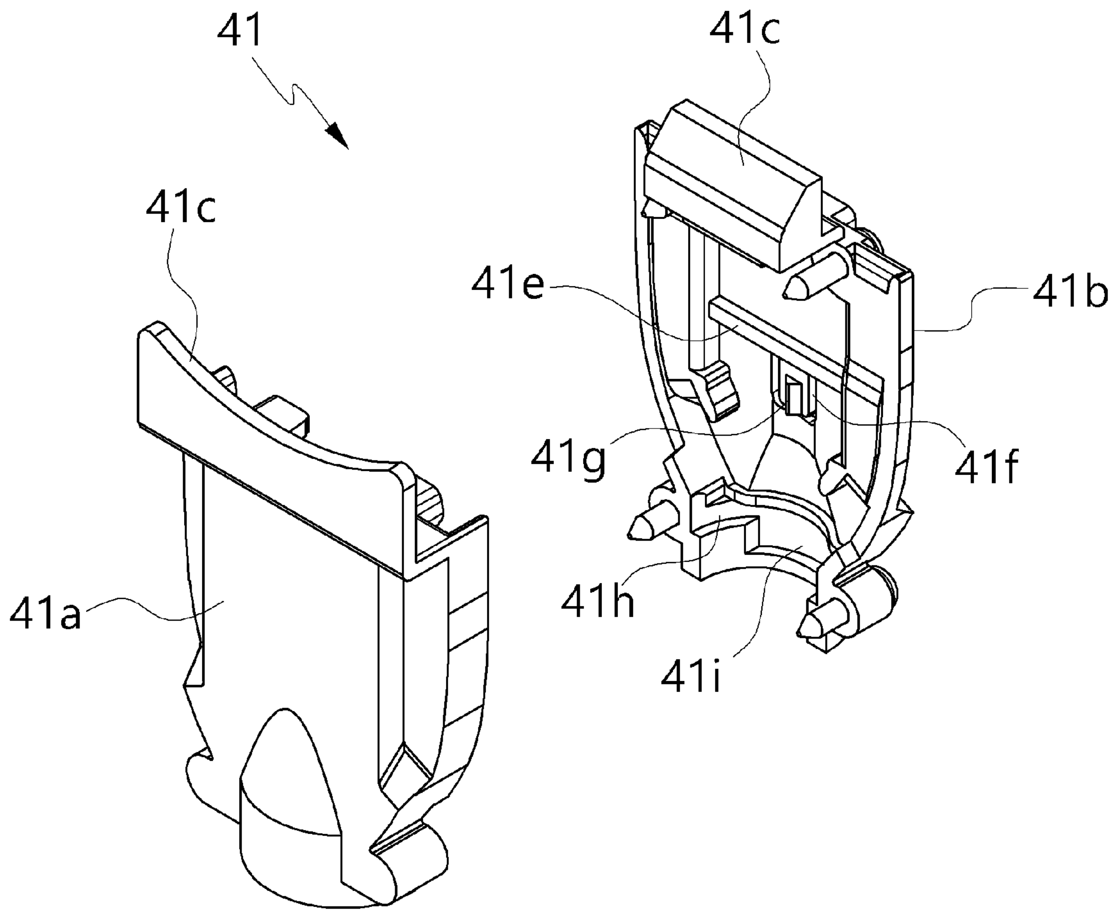

【FIG. 7】
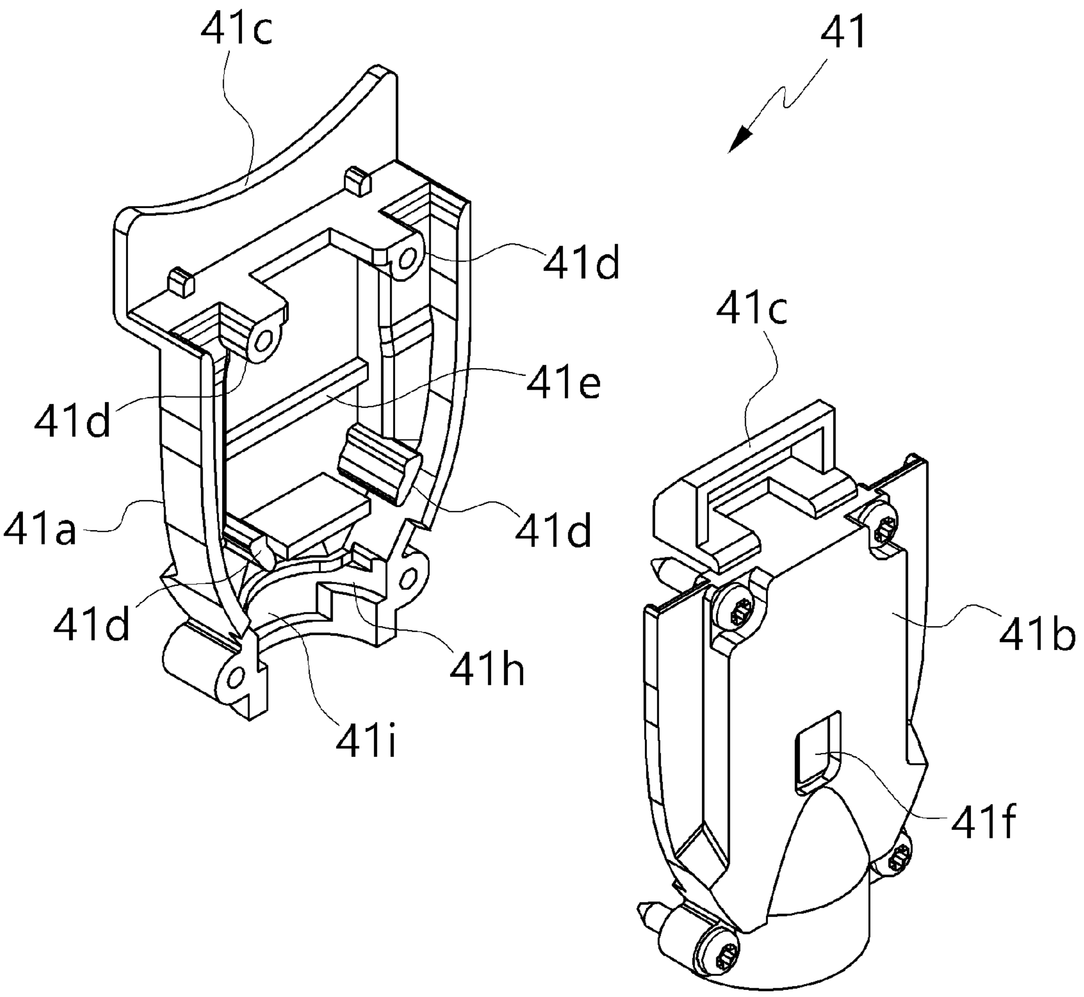

【FIG. 8】
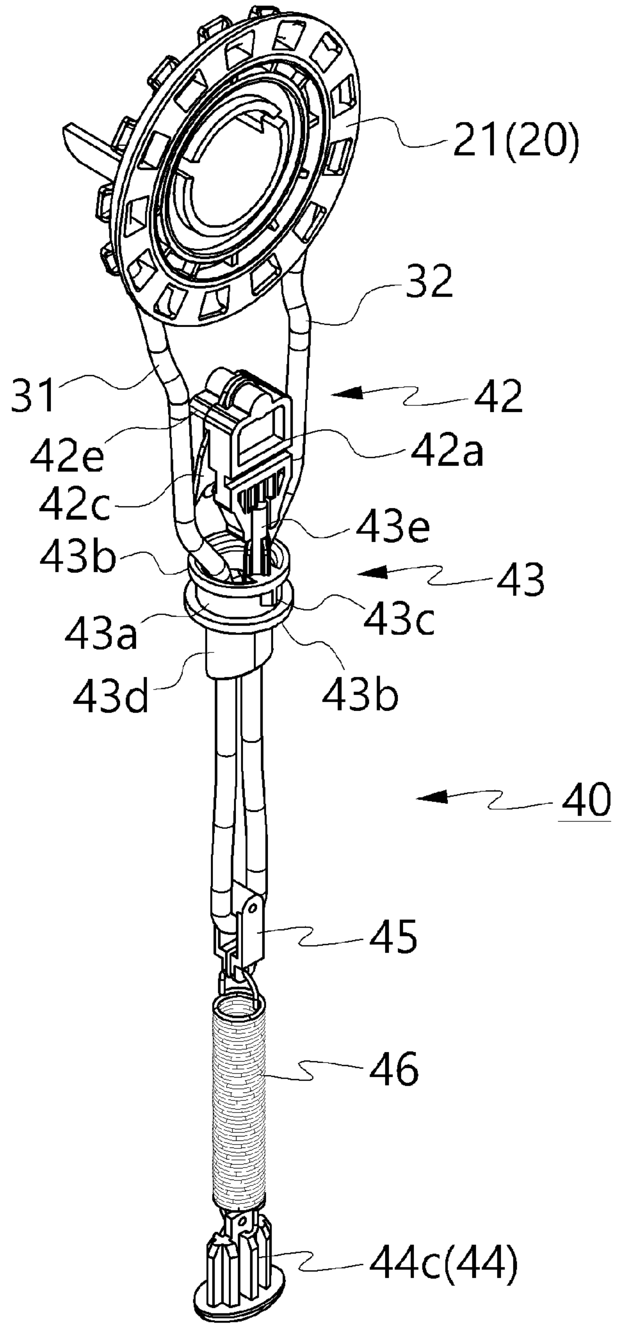

【FIG. 9】
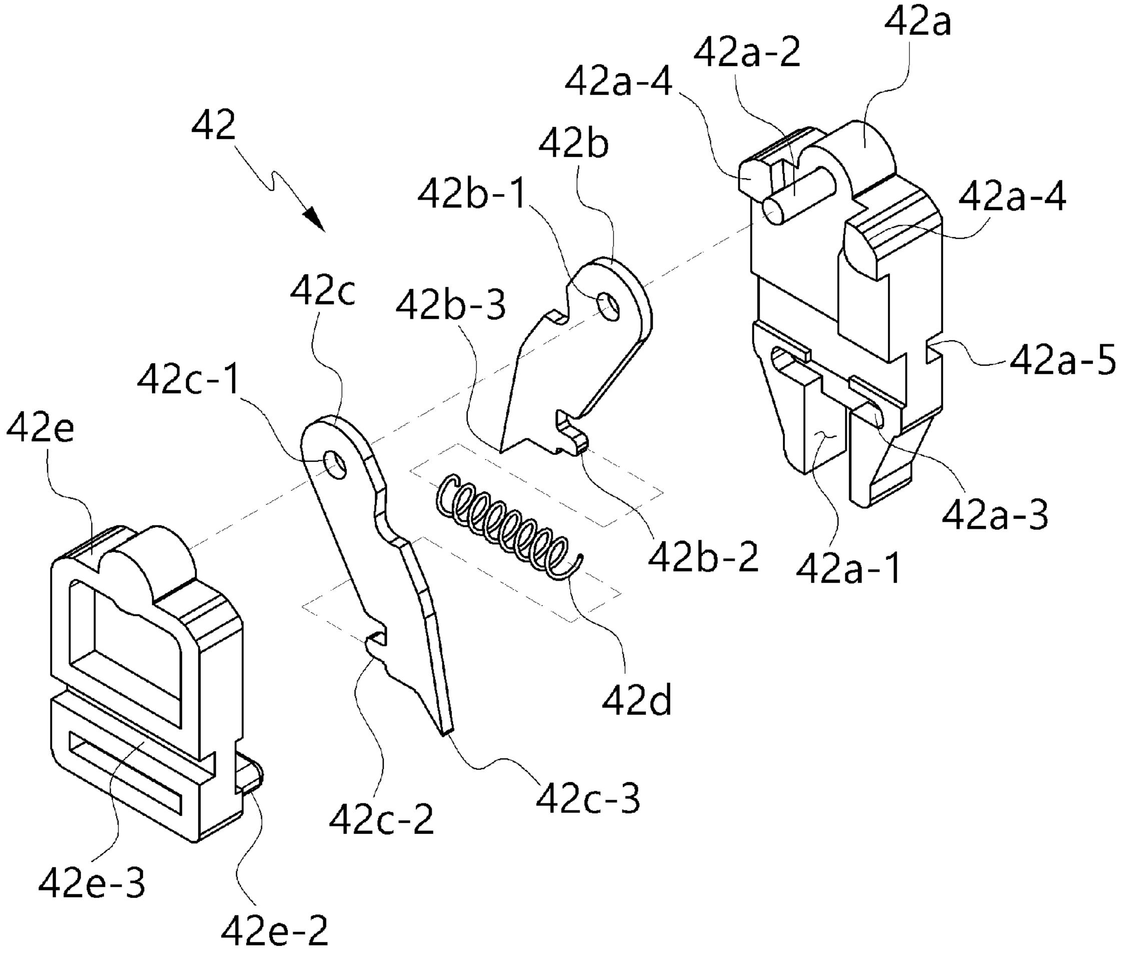

【FIG. 10】
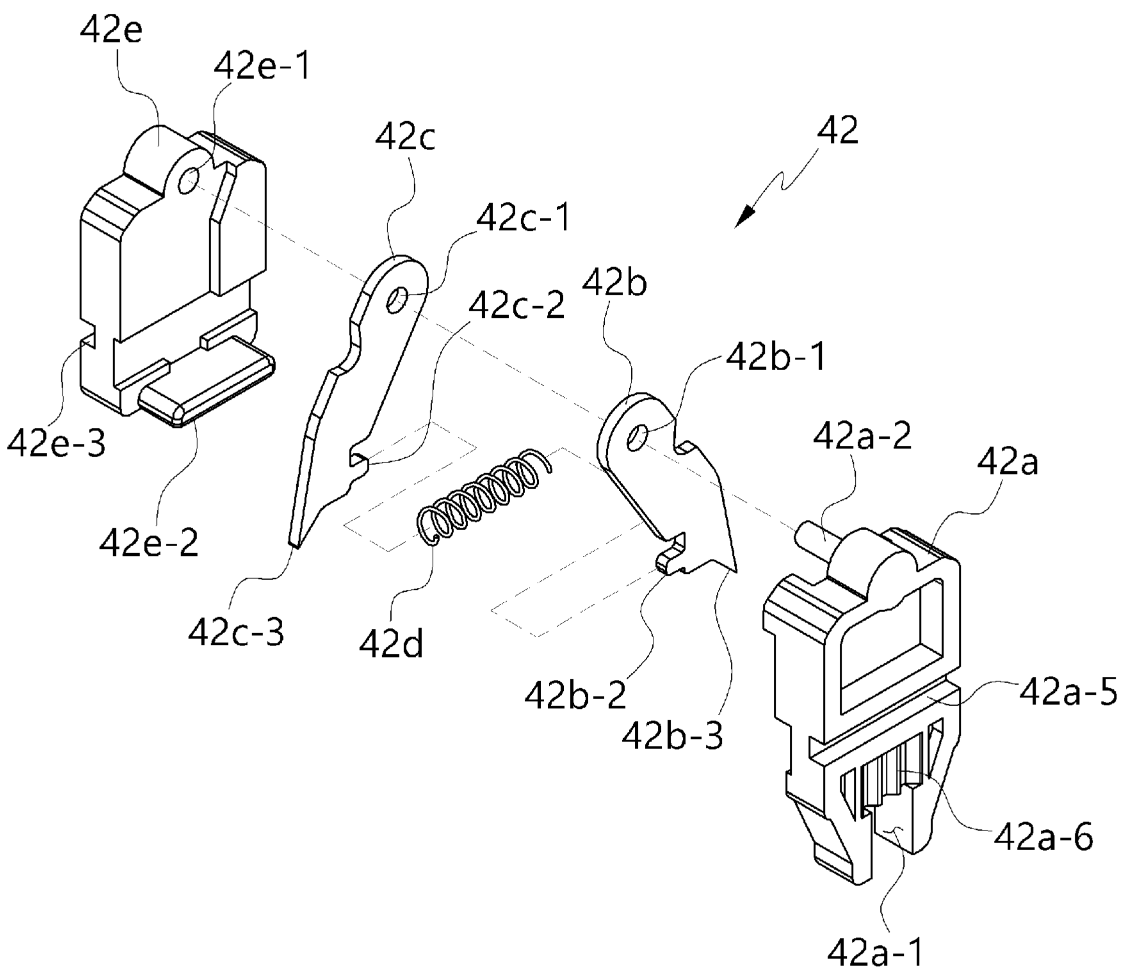

【FIG. 11】
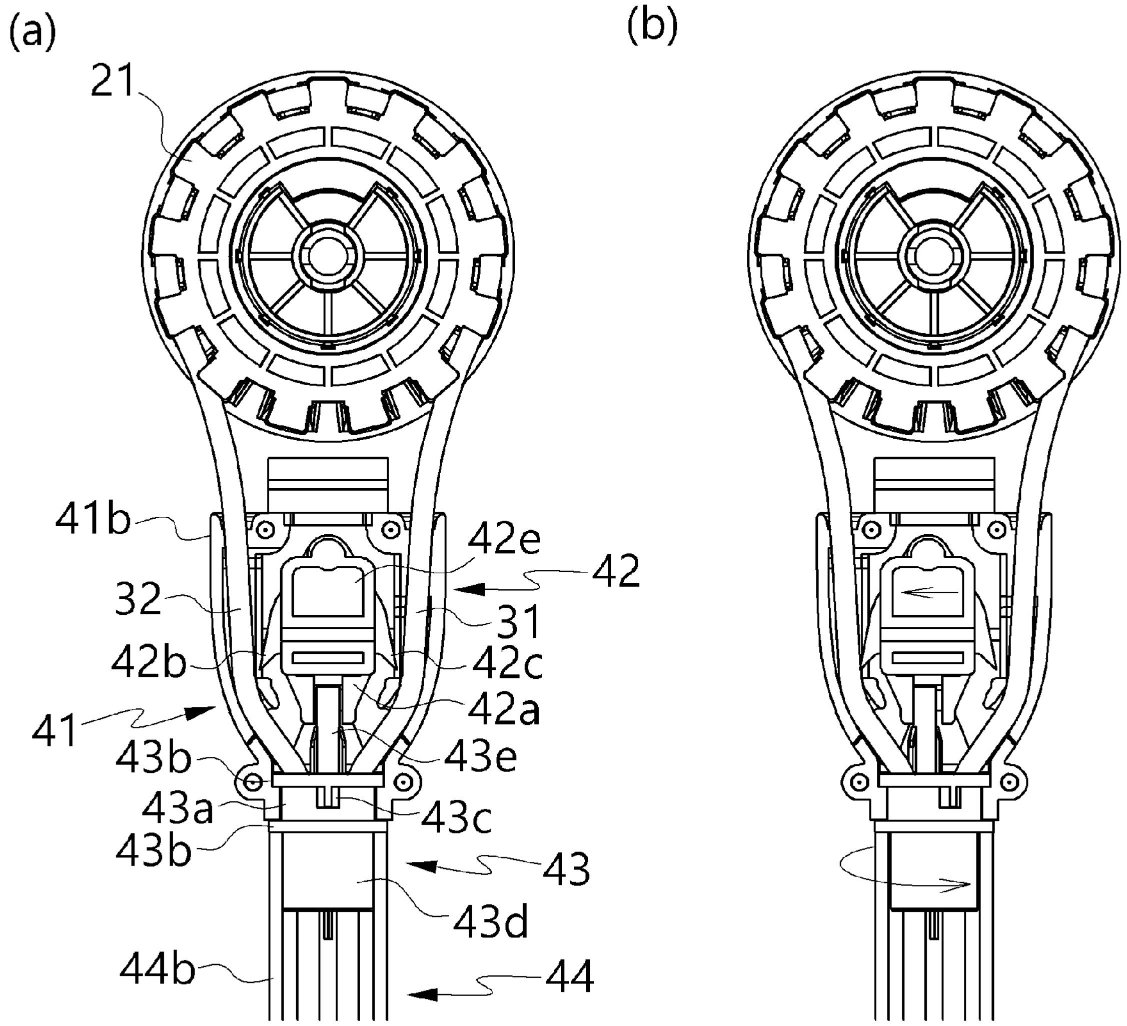

【FIG. 12】
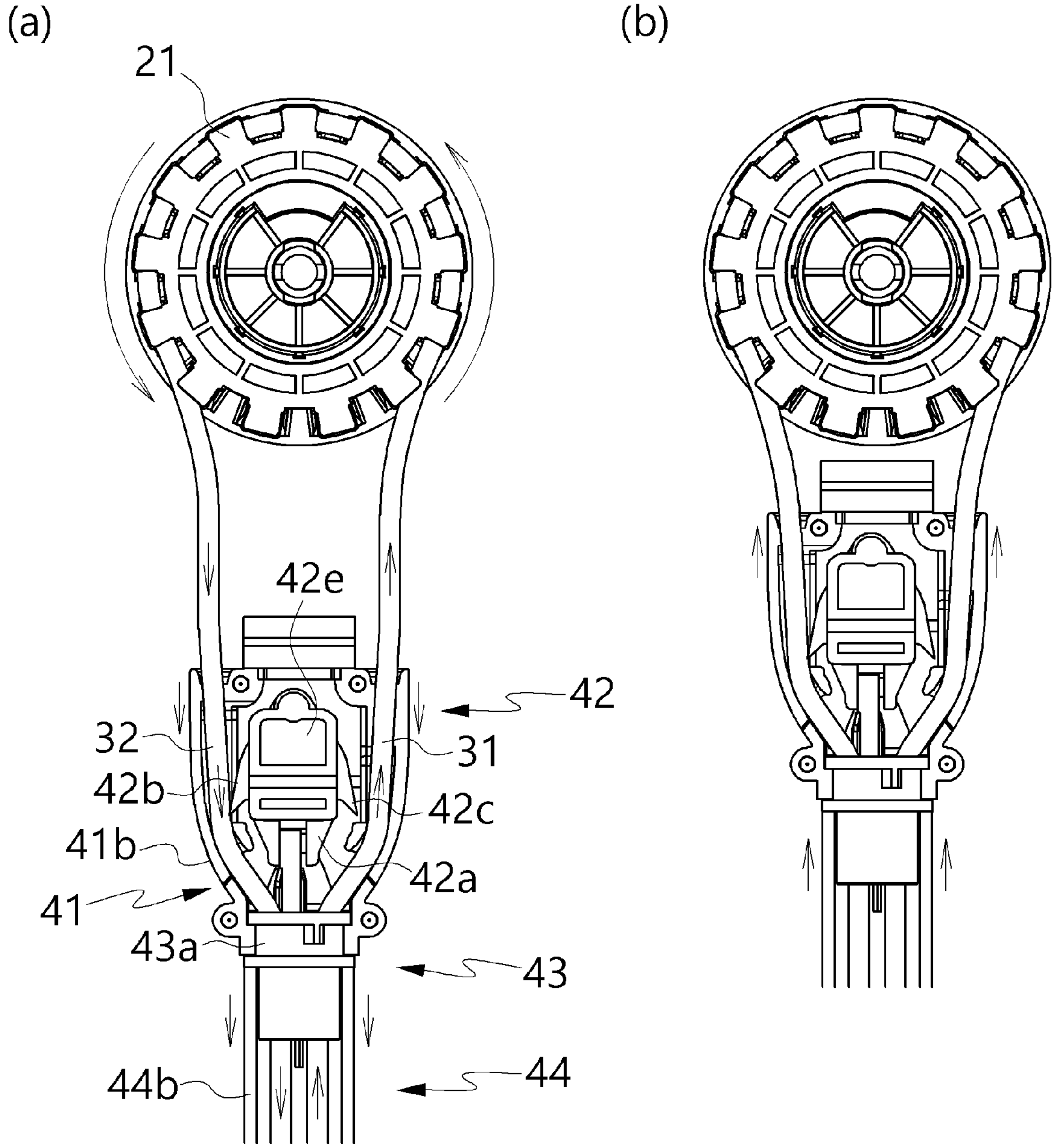

【FIG. 13】
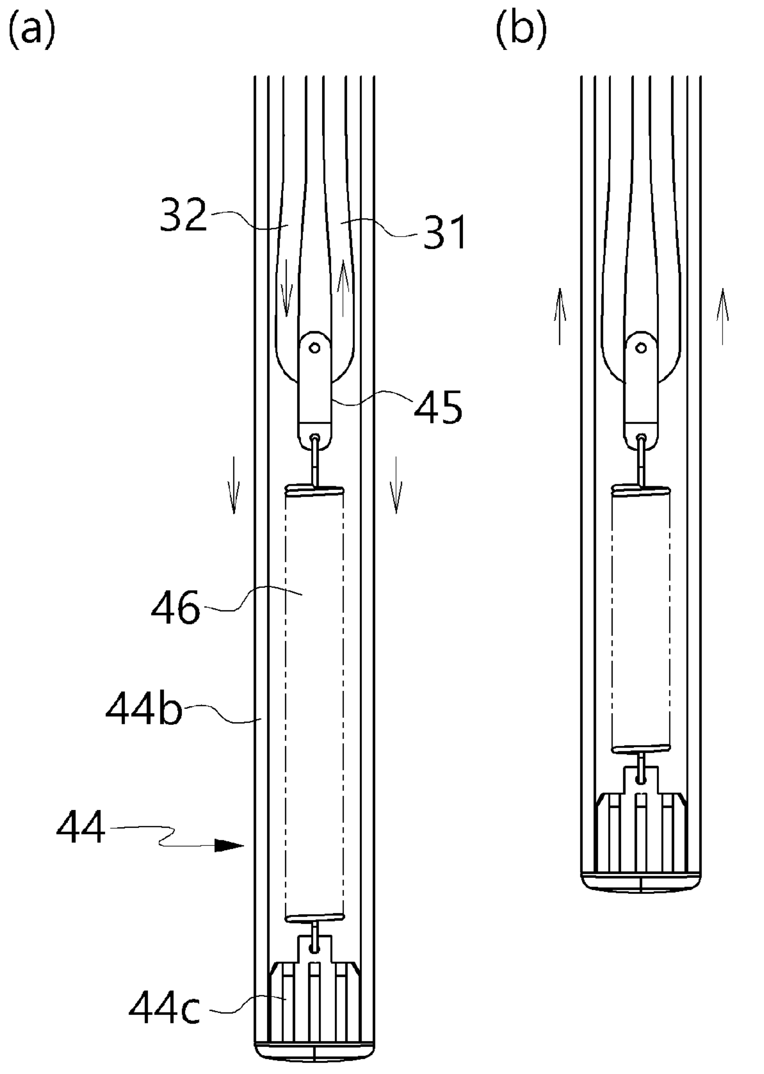

ROLLER BLIND DRIVE DEVICE PREVENTING ACCIDENT DUE TO DRIVE CORD

CROSS REFERENCE TO RELATED APPLICATION

The present application claims priority to Korean Patent Application No. 10-2022-0066847, filed May 31, 2022, the entire contents of which are incorporated herein for all purposes by this reference.

BACKGROUND OF THE INVENTION

Field of the Invention

The present disclosure relates generally to a roller blind drive device which lowers or raises a curtain fabric by performing the forward/reverse rotation of a drum on which the curtain fabric is wound. More particularly, the present disclosure relates to a roller blind drive device preventing an accident due to a drive cord in which a drive cord including two cords is covered so as not to be seen from the outside, thereby preventing a dangerous situation in which the drive cord is wrapped around a person's body, and one cord of the two cords is held according to the rotating manipulation of a manipulation tube, thereby lowering or raising the curtain fabric only by a simple manipulation of pulling the manipulation tube down.

Description of the Related Art

Generally, a roller blind is configured such that a curtain fabric which blocks light is wound on a drum, and the curtain fabric is lowered or raised according to forward/reverse rotation of the drum.

That is, a drive device which transmits forward/reverse rotational force generated by a user to the drum is provided on one side or each of opposite sides of the roller blind.

Such a drive device is basically composed of a pulley connected to the drum so as to rotate same, and a drive cord connected to the pulley so as to receive a rotational force from a user.

Here, the drive cord connected to the pulley is made in a circular closed type of drive cord, and includes two cords hanging on the pulley in a loop type toward the lower side of the roller blind.

That is, when a user pulls down one drive cord, the drum is rotated forward and the curtain fabric is lowered, but when a user pulls down the other drive cord, the drum is rotated reversely and the curtain fabric is raised.

As for such a roller blind, the two cords are connected to each other in a loop type, and unless otherwise indicated, it is impossible to know which cord is responsible for forward/reverse rotation, which causes inconvenience.

In addition, for the convenience of a user's manipulation, the cords are extending up to the lower part of a window by having a relatively long length, and thus when the window is opened, the curtain fabric flaps due to the outside air.

Particularly, there is a serious problem that the drive cords may be wrapped around a person's body due to the intention of a user or the carelessness of children, which may lead to death.

Accordingly, in order to solve such problems, the following patent document discloses a technology in which two drive cords are covered so as not to be exposed to the outside and any one of the two cords is held to be pulled.

That is, the drive cords are covered and are prevented from being exposed to the outside, and thus a dangerous situation in which the drive cords may be wrapped around a user's body can be prevented.

However, in order to hold any one of the two drive cords, a process in which the one cord is pulled down by being slanted forward or backward and is raised in a straightly standing state is required to be performed.

Furthermore, the holding force of the drive cord varies depending on an inclined angle, and thus when the drive cord is not inclined at a proper angle, the drive cord may slip and may not be manipulated.

Document of Related Art (Patent Document 1) Korean Patent No. 10-2077404 Invention Title: DRIVING DEVICE HAVING PROTECTIVE COVER FOR ROLLER BLIND CORD

SUMMARY OF THE INVENTION

Accordingly, the present disclosure has been made keeping in mind the above problems occurring in the related art, and the present disclosure is intended to propose a roller blind drive device preventing an accident due to a drive cord in which a holding member is moved by the rotating manipulation of a manipulation tube and holds any one cord of two cords such that a curtain fabric can be lowered or raised only by a simple manipulation of pulling the manipulation tube down.

In addition, the present disclosure is intended to propose a roller blind drive device preventing an accident due to a drive cord in which a holder of the holding member holding a drive cord presses the drive cord such that the drive cord slants downward, so that the associated drive cord is securely held only when the drive cord is pulled downward, and the holding of the associated drive cord is automatically released when the drive cord is returned to a raised position, thereby lowering or raising the curtain fabric to a desired position only by repeating the pulling manipulation.

Furthermore, the present disclosure is intended to propose a roller blind drive device preventing an accident due to a drive cord in which a tension spring allows the drive cord to be maintained in taut tension and allows the manipulation tube lowered by pulling to be automatically returned to a raised position, whereby the convenience of use is improved and a neat and tidy interior is created, thereby increasing satisfaction of a user overall.

In order to achieve the above objectives, according to one aspect of the present disclosure, there is provided a roller blind drive device preventing an accident due to a drive cord, the drive device being configured to lower or raise a curtain fabric 1 by performing forward/reverse rotation of a drum 2 on which the curtain fabric 1 is wound, the drive device including a fixed part 10 disposed fixedly at a side of the drum 2; a rotating part 20 mounted rotatably to the fixed part 10 and configured to perform the forward/reverse rotation of the drum 2 such that the curtain fabric 1 is lowered or raised; a circular drive cord 30 having a front cord 31 and a rear cord 32 which are connected to the rotating part 20 in an infinite loop so as to be rotated in a same direction and hang toward a lower side of the fixed part 10 such that the front cord 31 and the rear cord 32 are spaced apart from each other; and manipulating part 40 connected to the drive cord 30 exposed to the lower side of the fixed part 10, the manipulating part 40 being configured to perform forward/reverse rotation of the drive cord 30 by selectively gripping the front cord 31 or the rear cord 32 according to rotating and pulling manipulations of the manipulating part 40 performed by a user.

In this case, according to the present disclosure, the fixed part 10 may include: a fixed casing 11 having an inner diameter to receive the rotating part 20 and having a path provided on a lower end of the fixed casing 11 by having a predetermined size such that the drive cord 30 is connected to the rotating part 20 and the manipulating part 40, and a fixed shaft 12 being inserted into and mounted to a center of the fixed casing 11 and supporting the rotating part 20 such that the rotating part 20 is rotatable.

In addition, according to the present disclosure, the fixed casing 11 may include: a cord guide 11*a* protruding on each of front and rear sides of the lower end of the fixed casing 11 by having a predetermined length such that the drive cord 30 connected to the rotating part 20 is aligned with the manipulating part 40, and a manipulation guide 11*b* connected to and protruding on one side of the guide protrusion part 11*a* in a front-to-rear direction such that the manipulating part 40 is returned to an original position.

Furthermore, according to the present disclosure, the rotating part 20 may include: a rotating wheel 21 being rotatably mounted inside the fixed part 10 and connected with the drive cord 30 so as to receive forward/reverse rotational force therefrom, and a drum holder 22 being mounted to the rotating wheel 21 by being engaged therewith, and configured to being inserted into a center of one side of the drum 2 so as to perform the forward/reverse rotation of the drum 2.

Additionally, according to the present disclosure, the manipulating part 40 may include: a manipulation cover 41 disposed to cover the drive cord 30 exposed to the lower side of the fixed part 10, and receiving the front and rear cords 31 and 32 of the drive cord 30 such that the front and rear cords 31 and 32 are separated from each other in a front-to-rear direction and move upward and downward; a holding member 42 being mounted to a center of the manipulation cover 41 so as to move slidably forward and backward, the holding member 42 being configured to press and hold the front and rear cords 31 and 32 according to the forward and backward movements of the holding member 42, respectively; a rotating member 43 being rotatably mounted to a lower end of the manipulation cover 41 and connected to the holding member 42 so as to move the holding member 42 forward and backward; a manipulation tube 44 being mounted to a lower end of the rotating member 43 and receiving the drive cord 30 so as to receive rotational force of the rotating member 43 and downward movement force of the front and rear cords 31 and 32 from a user; a connecting member 45 being mounted in a center of the manipulation tube 44 and connected to the drive cord 30 in an infinite loop; and a tension spring 46 being mounted to a center of a lower end of the manipulation tube 44 and connected to the connecting member 45, the tension spring 46 allowing the drive cord 30 to be maintained in predetermined tension by pulling the connecting member 45 down and allowing the manipulation cover 41 to be returned to a raised position adjacent to the fixed part 10.

In addition, according to the present disclosure, the manipulation cover 41 may include: an inner cover 41*a* disposed on one side of a lower part of the fixed part 10 and receiving the front and rear cords 31 and 32, the holding member 42, and the rotating member 43, and an outer cover 41*b* being mounted to the inner cover 41*a* to cover the inner cover 41*a*, the outer cover 41*b* restricting the front and rear cords 31 and 32, the holding member 42, and the rotating member 43 such that the front and rear cords 31 and 32, the holding member 42, and the rotating member 43 are mounted in the inner cover 41*a*.

Furthermore, according to the present disclosure, the manipulation cover 41 may include: a cover guide 41*c* protruding on an upper end of each of the inner and outer covers 41*a* and 41*b*, the cover guide 41*c* being guided to be returned to an original position by interfering with a lower end portion of the fixed part 10; separating protrusion parts 41*d* protruding on upper and lower ends of one surface of the inner cover 41*a* by having predetermined lengths, the separating protrusion parts 41*d* separating the front and rear cords 31 and 32 from each other such that the front and rear cords 31 and 32 move upward and downward; a guide rail 41*e* protruding on a center of one surface of each of the inner and outer covers 41*a* and 41*b* such that the guide rail 41*e* is horizontal in the front-to-rear direction, the guide rail 41*e* supporting the holding member 42 such that the holding member 42 slides forward and backward; an elastic plate 41*f* protruding on a center of the outer cover 41*b* by being cut in a U shape such that elastic plate 41*f* is bent leftward and rightward according to the sliding of the holding member 42; a hold protrusion part 41*g* protruding on a center of one surface of the elastic plate 41*f* by having a cone shape such that the manipulation cover 41 is engaged with the holding member 42 so as to hold the holding member 42 at a position to which the holding member 42 slides; a rotation groove part 41*h* being recessed in a lower end of one surface of each of the inner and outer covers 41*a* and 41*b* by being stepped in a semicircular shape, the rotation groove part 41*h* being configured to restrict the rotating member 43 such that the rotating member 43 is rotatable; and a hold groove part 41*i* being recessed in a lower end of one surface of each of the inner and outer covers 41*a* and 41*b* by being stepped in an arc shape, the hold groove part 41*i* being configured to interfere with the rotating member 43 so as to limit a rotation range of the rotating member 43.

Additionally, according to the present disclosure, the holding member 42 may include: a holding block 42*a* being mounted to a first side of an inside of the manipulation cover 41 so as to slide forward and backward, the holding block 42*a* being configured to be connected to the rotating member 43 so as to receive forward and backward movement force therefrom; a rear holder 42*b* being mounted to a center of an upper end of the holding block 42*a* so as to be rotated forward and backward, the rear holder 42*b* being configured to press the rear cord 32 so as to slant the rear cord 32 downward according to backward movement of the holding block 42*a* such that the rear cord 32 is held to perform only downward movement; a front holder 42*c* being mounted to the center of the upper end of the holding block 42*a* so as to be rotated forward and backward, the front holder 42*c* being configured to press the front cord 31 so as to slant the front cord 31 downward according to forward movement of the holding block 42*a* such that the front cord 31 is held to perform only downward movement; a compression spring 42*d* provided between the front and rear holders 42*c* and 42*b* and configured to apply predetermined elastic force to each of the front and rear holders 42*c* and 42*b* such that each of the front and rear holders 42*c* and 42*b* is rotated outward; and a holding cover 42*e* being mounted on a second side of the inside of the manipulation cover 41 so as to slide forward and backward, the holding cover 42*e* covering the holding block 42*a* so as to prevent removal of each of the front and rear holders 42*c* and 42*b*.

In addition, according to the present disclosure, the holding block 42*a* may include: a connection groove part 42*a*-1 being cut through a center of a lower end of the holding block 42*a* by having a predetermined size such that the connection groove part 42*a*-1 is connected to the rotating member 43 so as to receive forward and backward movement force therefrom; a rotation pin 42*a*-2 inserted into and mounted to or protruding integrally from an upper end of a first surface of the holding block 42*a* such that the front and rear holders 42*c* and 42*b* are rotatably mounted on the rotation pin 42*a*-2 while overlapping each other; a cover groove part 42*a*-3 being recessed horizontally in the front-to-rear direction in a lower end of the first surface of the holding block 42*a* such that the holding block 42*a* and the holding cover 42*e* together move forward and backward by being engaged with each other; older protrusion parts 42*a*-4 protruding on the upper end of the first surface of the holding block 42*a* by having depths to receive the front and rear holders 42*c* and 42*b* such that the holder protrusion parts 42*a*-4 interfere with the front and rear holders 42*c* and 42*b* so as to limit outward rotating ranges thereof; a block rail groove part 42*a*-5 being recessed horizontally in the front-to-rear direction in a center of a second surface of the holding block 42*a* such that the holding block 42*a* slides forward and backward by being engaged with the manipulation cover 41; and holding groove parts 42*a*-6 being arranged in a lower end of the second surface of the holding block 42*a* by being recessed at predetermined intervals therefrom such that the holding block 42*a* is engaged with the manipulation cover 41 so as to be held at a position to which the holding block 42*a* slides.

Furthermore, according to the present disclosure, the front and rear holders 42*c* and 42*b* may include: holder rotation holes 42*b*-1 and 42*c*-1 formed respectively through centers of upper ends of the rear and front holders 42*b* and 42*c* by having predetermined diameters, respectively, such that the front and rear holders 42*c* and 42*b* are mounted to an upper end of the holding block 42*a* so as to be rotatable forward and backward directions; spring protrusion parts 42*b*-2 and 42*c*-2 protruding respectively on lower ends of surfaces of the rear and front holders 42*b* and 42*c* facing each other by having predetermined sizes, respectively, such that the spring protrusion parts 42*b*-2 and 42*c*-2 are inserted into the compression spring 42*d* receive outward rotating forces therefrom; and holder blades 42*b*-3 and 42*c*-3 respectively protruding slantingly on lower ends of the rear and front holders 42*b* and 42*c* by having V shapes such that the holder blades 42*b*-3 and 42*c*-3 press the rear and front cords 32 and 31 by being in linear contact therewith so as to hold the rear and front cords 32 and 31.

Additionally, according to the present disclosure, the holding cover 42*e* may include: pin hole part 42*e*-1 being recessed in an upper end of a first surface of the holding cover 42*e* by having a depth to receive the rotation pin 42*a*-2 such that each of the front and rear holders 42*c* and 42*b* is rotatably mounted on the rotation pin 42*a*-2 while overlapping each other; a cover protrusion part 42*e*-2 protruding on a lower end of the first surface of the holding cover 42*e* by having a size to be engaged with the cover groove part 42*a*-3 such that the cover protrusion part 42*e*-2 is inserted into the cover groove part 42*a*-3 so as to move together with the cover groove part 42*a*-3; and a cover rail groove part 42*e*-3 being recessed horizontally in the front-to-rear direction in a center of a second surface of the holding cover 42*e* such that the cover rail groove part 42*e*-3 is engaged with the manipulation cover 41 so as to slide the holding cover 42*e* forward and backward.

In addition, according to the present disclosure, the rotating member 43 may include: a rotating body 43*a* having an outer diameter to be mounted inside the manipulation cover 41 and having an inner diameter to receive the drive cord 30; a rotation boss 43*b* protruding outward on each of upper and lower ends of the rotating body 43*a* by having a predetermined diameter, the rotation boss 43*b* being engaged with and holding the manipulation cover 41 such that the rotating member 43 is rotatable; a holding protrusion part 43*c* protruding on one side of an outer surface of the rotating body 43*a* by having a predetermined size, the holding protrusion part 43*c* being configured to interfere with the manipulation cover 41 such that a rotation range of the rotating body 43*a* is limited; a connection boss 43*d* protruding on the lower end of the rotating body 43*a* by having a predetermined shape, the connection boss 43*d* being configured to be inserted into the manipulation tube 44 so as to receive the rotational force and the downward movement force from a user; and a crankshaft 43*e* protruding on one side of an upper end of the rotating body 43*a* by having a predetermined length, the crankshaft 43*e* being configured to be connected to the holding member 42 such that rotational movement is changed into forward/backward rectilinear movement so as to transmit the rectilinear movement to the holding member 42.

Furthermore, according to the present disclosure, the manipulation tube 44 may include: an inner tube 44*a* which is mounted to a first side of the lower end of the rotating member 43 so as to cover the first side thereof and receives the front and rear cords 31 and 32, the connecting member 45, and the tension spring 46; n outer tube 44*b* which is mounted to a second side of the lower end of the rotating member 43 so as to cover the second side thereof and restricts the front and rear cords 31 and 32, the connecting member 45, and the tension spring 46 such that the front and rear cords 31 and 32, the connecting member 45, and the tension spring 46 are mounted in the inner tube 44*a* by being covered by the outer tube 44*b*; and a spring cap 44*c* being inserted and mounted into a center portion between lower ends of the inner and outer tubes 44*a* and 44*b*, the spring cap 44*c* being connected to a lower end of the tension spring 46 such that the drive cord 30 is held to be pulled.

First, according to the present disclosure, the drive cord including two drive cords is covered so as not to be seen from the outside, thereby preventing a dangerous situation in which the drive cord is wrapped around a person's body.

Second, according to the present disclosure, the holding member is moved by the rotating manipulation of the manipulation tube and holds any one drive cord of two drive cords, thereby lowering or raising the curtain fabric only by a simple manipulation of pulling the manipulation tube down.

Third, according to the present disclosure, the holder of the holding member holding the drive cord presses the drive cord such that the drive cord slants downward, so that the associated drive cord is securely held only when the drive cord is pulled downward, and the holding of the associated drive cord is automatically released when the drive cord is returned to a raised position, thereby lowering or raising the curtain fabric to a desired position only by repeating the pulling manipulation.

Fourth, according to the present disclosure, the tension spring allows the drive cord to be maintained in taut tension and allows the manipulation tube lowered by pulling to be automatically returned to a raised position, whereby the convenience of use is improved and a neat and tidy interior is created, thereby increasing satisfaction of a user overall.

In addition to the above-described effects, specific effects of the present disclosure will be described together while explaining specific details for carrying out the invention below.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a front view illustrating a roller blind to which a drive device according to the present disclosure is applied;

FIG. 2 is a perspective view illustrating the overall appearance of the drive device according to the present disclosure;

FIGS. 3 and 4 are exploded perspective views of the drive device according to the present disclosure;

FIGS. 5(*a*) and 5(*b*) are perspective views illustrating, in detail, a fixed casing the drive device according to the present disclosure;

FIGS. 6 and 7 are perspective views illustrating, in detail, a manipulation casing of the drive device according to the present disclosure;

FIG. 8 is a perspective view illustrating, in detail, the internal structure of the drive device according to the present disclosure;

FIGS. 9 and 10 are perspective views illustrating, in detail, a holding member of the drive device according to the present disclosure; and FIGS. 11(*a*), 11(*b*), 12(*a*), 12(*b*), 13(*a*), and 13(*b*) are front views illustrating the operation process of the drive device according to the present disclosure.

DETAILED DESCRIPTION OF THE INVENTION

Hereinafter, the embodiment of the present document will be described with reference to the accompanying drawings. However, this is not intended to limit the technology described in this document to a specific embodiment, and it should be understood that various modifications, equivalents, and/or alternatives of the embodiment of this document are included. In connection with the description of the drawings, like reference numerals may be used for like components.

In addition, expressions such as "first" and "second" used in this document may modify various elements regardless of order and/or importance, and are used only to distinguish one element from another element but do not limit the corresponding components. For example, "first part" and "second part" may represent different parts regardless of order or importance. For example, without departing from the scope of the claims described in this document, the first component may be named as the second component, and similarly, the second component may also be named as the first component.

In addition, terms used in this document are used only to describe a specific embodiment, and may not be intended to limit the scope of other embodiments. A singular expression may include a plural expression unless the context clearly dictates otherwise. Terms used herein, including technical or scientific terms, may have the same meanings as commonly understood by those skilled in the art described in this document. Among the terms used in this document, terms defined in a general dictionary may be interpreted to have the same or similar meaning as meaning in the context of the related art, and unless explicitly defined in this document, are not interpreted as deal or excessively formal meanings. In some cases, even terms defined in this document cannot be construed to exclude the embodiment of the present document.

The present disclosure relates to a roller blind drive device which lowers or raises a curtain fabric 1 by performing the forward/reverse rotation of a drum 2 on which a curtain fabric 1 is wound as illustrated in FIG. 1. The present disclosure relates to a roller blind drive device preventing an accident due to a drive cord, the drive device having a fixed part 10, a rotating part 20, a drive cord 30, and a manipulating part 40 as important components as illustrated in FIGS. 2 to 4.

In this case, forward rotation mentioned in the present disclosure indicates the clockwise rotation of the drum 2 when the roller blind is seen from the right side relative to FIG. 1.

That is, when the drum 2 is rotated in clockwise, the curtain fabric 1 wound on the drum 2 is lowered while being unwound, and when the drum 2 is rotated in counterclockwise, the curtain fabric 1 is raised while being wound on the drum 2.

First, as illustrated in FIG. 1, the fixed part 10 according to the present disclosure is fixedly disposed on the right or left side of the drum 2 and supports the drum 2 such that the drum 2 is rotatable.

As illustrated in FIGS. 2 to 4, such a fixed part 10 is composed of a fixed casing 11 and a fixed shaft 12.

The fixed casing 11 is formed in a disk shape having an inner diameter such that the fixed casing 11 can receive a rotating wheel 21 to be described later.

The fixed shaft 12 is inserted into and mounted to the center of the fixed casing 11 and supports the rotating wheel 21 such that the rotating wheel 21 is rotatable.

Here, the fixed casing 11 is configured to have an open path, which has a predetermined size, formed on a lower end thereof such that the drive cord 30 is connected to the rotating part 20 and the manipulating part 40.

In this case, as illustrated in FIGS. 5(*a*) and 5(*b*), the fixed casing 11 includes a cord guide 11*a* and a manipulation guide 11*b* formed therein.

The cord guide 11*a* protrudes on each of the front and rear sides of the lower end of the fixed casing 11 by having a predetermined length, and guides the drive cord 30 connected to the rotating wheel 21 such that the drive cord 30 is connected to the manipulating part 40 by being in alignment therewith.

The manipulation guide 11*b* is connected to and protrudes on one side of a guide protrusion part 11*a* in a front-to-rear direction, and guides the return of the manipulating part 40 lowered by a user to an original position.

That is, the manipulation guide 11*b* interferes with and arranges cover guides 41*c* of a manipulation cover 41 raised by a tension spring 46 to be described later such that the manipulation cover 41 is returned to an original position.

Next, the rotating part 20 according to the present disclosure is mounted rotatably to the fixed part 10 as illustrated in FIG. 1 and allows the forward/reverse rotation of the drum 2 to be performed such that the curtain fabric 1 is lowered or raised.

As illustrated in FIGS. 2 to 4, such a rotating part 20 is composed of the rotating wheel 21 and a drum holder 22.

The rotating wheel 21 is rotatably mounted to the inner center of the fixed casing 11, and receives forward/reverse rotational force transmitted by the drive cord 30 wound on the outer surface of the rotating wheel 21.

The drum holder 22 is mounted to the rotating wheel 21 by being engaged therewith and is inserted into the center of one side of the drum 2 so as to perform the forward/reverse rotation of the drum 2.

Next, as illustrated in FIGS. 1 to 4, the drive cord 30 according to the present disclosure is connected to the rotating wheel 21 and a connecting member 45 in an infinite loop.

Such a drive cord 30 includes a front cord 31 and a rear cord 32, each end of which is connected to each other, with the front cord 31 and the rear cord 32 being spaced apart from each other inside the fixed casing 11 located between the rotating wheel 21 and the connecting member 45.

That is, FIGS. 11(*a*), 11(*b*), 12(*a*), and 12(*b*) are views illustrating the roller blind seen from the left side, and the front cord 31 is disposed at the right side, and the rear cord 32 is disposed at the left side.

Accordingly, when the front cord 31 is lowered, the rear cord 32 is raised, and at the same time, the rotating wheel 21 and the drive cord 30 are rotated clockwise.

Contrarily, when the rear cord 32 is lowered, the front cord 31 is raised, and at the same time, the rotating wheel 21 and the drive cord 30 are rotated counterclockwise.

Finally, as illustrated in FIGS. 1 and 2, the manipulating part 40 according to the present disclosure is connected to the drive cord 30 hanging toward the lower side of the fixed casing 11.

That is, the front cord 31 or the rear cord 32 according to the rotation and pulling manipulations of the manipulating part 40 by a user is selectively gripped to allow the forward/reverse rotation of the drive cord 30 to be performed.

As illustrated in FIGS. 2 to 4, such a manipulating part 40 is composed of the manipulation cover 41, a holding member 42, a rotating member 43, a manipulation tube 44, the connecting member 45, and the tension spring 46.

The manipulation cover 41 is disposed to cover the drive cord 30 exposed to the lower side of the fixed part 10, and receives the front and rear cords 31 and 32 such that the front and rear cords 31 and 32 are separated from each other in the front-to-rear direction and are moved upward and downward.

The holding member 42 is mounted to the center of the manipulation cover 41 so as to move slidably forward and backward, and presses and holds the front and rear cords 31 and 32 according to the forward and backward movements of the holding member 42, respectively.

The rotating member 43 is rotatably mounted to the lower end of the manipulation cover 41 and is connected to the holding member 42 so as to move the holding member 42 forward or backward according to the rotation of the rotating member 43.

The manipulation tube 44 is mounted to the lower end of the rotating member 43 and receives the drive cord 30 so as to receive the rotational force of the rotating member 43 and the downward movement force of the front and rear cords 31 and 32 from a user.

The connecting member 45 is mounted in the center of the manipulation tube 44, and the drive cord 30 is connected to the upper end of the connecting member 45.

The tension spring 46 is mounted to the center of the lower end of the manipulation tube 44 and is connected to the connecting member 45 so as to pull the connecting member 45 down.

That is, the tension spring 46 allows the drive cord 30 to be maintained in predetermined tension and allows the manipulation cover 41 to be returned to a raised position adjacent to the fixed part 10.

In this case, the manipulation cover 41 is configured by being divided into an inner cover 41*a* and an outer cover 41*b*.

The inner cover 41*a* is disposed on the left side of the lower part of the fixed casing 11 relative to FIG. 3, and receives the front and rear cords 31 and 32, the holding member 42, and the rotating member 43.

The outer cover 41*b* is mounted to the right surface of the inner cover 41*a* so as to cover the right surface thereof, and restricts the front and rear cords 31 and 32, the holding member 42, and the rotating member 43 such that the front and rear cords 31 and 32, the holding member 42, and the rotating member 43 are mounted in the inner cover 41*a*.

As illustrated in FIGS. 6 and 7, such a manipulation cover 41 includes the cover guides 41*c*, separating protrusion parts 41*d*, guide rails 41*e*, an elastic plate 41*f*, a hold protrusion part 41*g*, a rotation groove part 41*h*, and a hold groove part 41*i*.

Each of the cover guides 41*c* protrudes on the upper end of each of the inner and outer covers 41*a* and 41*b*, and is guided to be returned to an original position by interfering with the manipulation guide 11*b* described above.

The separating protrusion parts 41*d* protrude on the upper and lower ends of the left surface of the inner cover 41*a* by having predetermined lengths, and separate the front and rear cords 31 and 32 from each other such that the front and rear cords 31 and 32 can move upward and downward.

The guide rails 41*e* protrude on the centers of side surfaces of the inner and outer covers 41*a* and 41*b* facing each other such that the guide rails 41*e* are horizontal in the front-to-rear direction.

That is, each of the guide rails 41*e* supports the holding member 42 to be described later such that the holding member 42 slides forward and backward.

The elastic plate 41*f* protrudes on the center of the outer cover 41*b* by being cut in a U shape such that the elastic plate 41*f* can be bent leftward and rightward according to the sliding of the holding member 42.

The hold protrusion part 41*g* protrudes on the center of the left surface of the elastic plate 41*f* by having a cone shape, and is engaged with one of holding groove parts 42*a*-6 so as to hold the holding member 42 at a position to which the holding member 42 slides.

The rotation groove part 41*h* is recessed in the lower end of a side surface of each of the inner and outer covers 41*a* and 41*b* facing each other by being stepped in a semicircular shape and restricts the rotating member 43 such that the rotating member 43 is rotatable.

The hold groove part 41*i* is recessed in the lower end of a side surface of each of the inner and outer covers 41*a* and 41*b* facing each other by being stepped in an arc shape, and limits the rotation range of the rotating member 43.

In addition, as illustrated in FIGS. 8 to 10, the holding member 42 includes a holding block 42*a*, a rear holder 42*b*, a front holder 42*c*, a compression spring 42*d*, and a holding cover 42*e*.

The holding block 42*a* is mounted to one side of the inside of the manipulation cover 41 so as to slide forward and backward, and is connected to a crankshaft 43*e* to be described later so as to receive forward and backward movement force therefrom.

Such a holding block 42*a* includes a connection groove part 42*a*-1, a rotation pin 42*a*-2, a cover groove part 42*a*-3, holder protrusion parts 42*a*-4, a block rail groove part 42*a*-5, and the holding groove parts 42*a*-6.

The connection groove part 42*a*-1 is cut through the center of the lower end of the holding block 42*a* by having a predetermined size, and receives the crankshaft 43*e* by being engaged therewith so as to receive forward and backward movement force therefrom.

The rotation pin 42*a*-2 is inserted into and mounted to or protrudes integrally on the upper end of the left surface of the holding block 42*a*, and supports the front and rear holders 42*c* and 42*b* such that the front and rear holders 42*c* and 42*b* can rotate while overlapping each other.

The cover groove part 42*a*-3 is recessed horizontally in the front-to-rear direction in the lower end of the left surface of the holding block 42*a*, and is connected to the holding cover 42*e* such that the holding block 42*a* and the holding cover 42*e* together move forward and backward by being engaged with each other.

The holder protrusion parts 42*a*-4 protrude on the upper end of the left surface of the holding block 42*a* by having depths to receive the front and rear holders 42*c* and 42*b*, and interfere with the front and rear holders 42*c* and 42*b* to limit outward rotating ranges thereof.

The block rail groove part 42*a*-5 is recessed horizontally in the front-to-rear direction in the center of the right surface of the holding block 42*a*, and is engaged with the guide rail 41*e* such that the holding block 42*a* is guided to slide forward and backward.

The holding groove parts 42*a*-6 are arranged in the lower end of the right surface of the holding block 42*a* by being recessed at predetermined intervals therefrom, and induce the holding of the holding block 42*a* such that each of the holding groove parts 42*a*-6 is engaged with the hold protrusion part 41*g* so as to allow the holding block 42*a* to be held at a position to which the holding block 42*a* slides.

The rear holder 42*b* and the front holder 42*c* are mounted to the rotation pin 42*a*-2 such that the rear holder 42*b* and the front holder 42*c* overlap each other, and each of the rear holder 42*b* and the front holder 42*c* rotates forward and backward relative to the rotation pin 42*a*-2.

That is, the rear holder 42*b* presses the rear cord 32 to slant the rear cord 32 downward according to forward and rearward movements of the holding block 42*a* such that the rear cord 32 is held to perform only downward movement.

In addition, the front holder 42*c* presses the front cord 31 to slant the front cord 31 downward according to forward and rearward movements of the holding block 42*a* such that the front cord 31 is held to perform only downward movement.

Such rear and front holders 42*b* and 42*c* respectively include holder rotation holes 42*b*-1 and 42*c*-1, spring protrusion parts 42*b*-2 and 42*c*-2, and holder blades 42*b*-3 and 42*c*-3.

The holder rotation holes 42*b*-1 and 42*c*-1 are formed respectively through the centers of the upper ends of the rear and front holders by having predetermined diameters and receive the rotation pin 42*a*-2.

The spring protrusion parts 42*b*-2 and 42*c*-2 protrude on lower ends of surfaces facing each other by having predetermined sizes, respectively, and are inserted into the compression spring 42*d* so as to receive outward rotating forces therefrom.

The holder blades 42*b*-3 and 42*c*-3 respectively protrude slantingly on lower ends of the rear and front holders 42*b* and 42*c* by having V shapes, and press the rear and front cords 32 and 31 by being in linear contact therewith.

The compression spring 42*d* is provided between the front and rear holders 42*c* and 42*b*, and applies predetermined elastic force to the front and rear holders 42*c* and 42*b* such that the front and rear holders 42*c* and 42*b* are opened in the front-to-rear direction.

The holding cover 42*e* is mounted to the left surface of the holding block 42*a* so as to cover the left surface of the holding block 42*a* and restricts the front and rear holders 42*c* and 42*b* so as to prevent removal of each of the front and rear holders 42*c* and 42*b*.

Such a holding cover 42*e* includes a pin hole part 42*e*-1, a cover protrusion part 42*e*-2, and a cover rail groove part 42*e*-3.

The pin hole part 42*e*-1 is recessed in the upper end of the right surface of the holding cover 42*e* by having a predetermined depth and receives the rotation pin 42*a*-2.

The cover protrusion part 42*e*-2 protrudes on the lower end of the right surface of the holding cover 42*e* by having a predetermined size and is inserted into the cover groove part 42*a*-3.

The cover rail groove part 42*e*-3 is recessed horizontally in the front-to-rear direction in the center of the left surface of the holding cover 42*e* and is engaged with the guide rail 41*e* such that the holding cover 42*e* is guided to slide forward and backward.

In addition, as illustrated in 8 and 11, the rotating member 43 includes a rotating body 43*a*, a rotation boss 43*b*, a holding protrusion part 43*c*, a connection boss 43*d*, and the crankshaft 43*e* which are integrated with each other.

The rotating body 43*a* is configured to have a tube shape having an outer diameter to be mounted in the manipulation cover 41 and an inner diameter to receive the drive cord 30.

The rotation boss 43*b* protrudes outward on each of the upper and lower ends of the rotating body 43*a* by having a predetermined diameter. The rotation boss 43*b* is engaged with each of the lower surface of the manipulation cover 41 and the rotation groove part 41*h* and holds the rotating body 43*a* such that the rotating body 43*a* is rotatable.

The holding protrusion part 43*c* protrudes on one side of the outer surface of the rotating body 43*a* by having a predetermined size, and interferes with the hold groove part 41*i* such that the rotation range of the rotating body 43*a* is limited.

The connection boss 43*d* protrudes on the lower end of the rotating body 43*a* by having a predetermined shape, and is inserted into the manipulation tube 44 such that the connection boss 43*d* receives a rotational force and downward movement force from a user.

The crankshaft 43*e* protrudes on the right side of the upper end of the rotating body 43*a* by having a predetermined length. The crankshaft 43*e* is inserted into the connection groove part 42*a*-1 such that rotational movement is changed into forward/backward rectilinear movement so as to transmit the rectilinear movement to the holding block 42*a*.

In addition, as illustrated in FIGS. 3 and 4, the manipulation tube 44 includes an inner tube 44*a*, an outer tube 44*b*, and a spring cap 44*c*.

The inner tube 44*a* is mounted to a first side of the connection boss 43*d* so as to cover the first side of the connection boss 43*d*, and receives the front and rear cords 31 and 32, the connecting member 45, and the tension spring 46 in the inner tube 44*a*.

The outer tube 44*b* is mounted to a second side of the connection boss 43*d* so as to cover the second side of the connection boss 43*d*, and restricts the front and rear cords 31 and 32, the connecting member 45, and the tension spring 46 such that the front and rear cords 31 and 32, the connecting member 45, and the tension spring 46 are mounted in the inner tube 44*a* by being covered by the outer tube 44*b*.

The spring cap 44*c* is inserted and mounted into a center portion between the lower ends of the inner and outer tubes 44*a* and 44*b*, and is connected to the lower end of the tension spring 46 such that the drive cord 30 is held to be pulled.

Hereinafter, the operation process of the drive device according to the present disclosure in which the curtain fabric 1 wound on the drum 2 is unwound and lowered will be described.

First, in order to lower the curtain fabric 1, a user turns the manipulation tube 44 right as illustrated in FIG. 11(*b*).

That is, when the rotating member 43 rotates right together with the manipulation tube 44, the holding member 42 connected to the rotating member 43 is moved to the left side (backward).

When the holding member 42 is moved to the left side, the rear holder 42*b* presses the rear cord 32 and holds the rear cord 32 in the manipulation casing 41.

In this state, when a user pulls the manipulation tube 44 down, the rear cord 32 is pulled down and the front cord 31 is moved upward as illustrated in FIG. 12(*a*).

That is, together with the drive cord 30, the rotating wheel 21 and the drum holder 22 are rotated counterclockwise relative to the drawing, and the curtain fabric 1 wound on the drum 2 is unwound and lowered as much as the rotating wheel 21 and the drum holder 22 are rotated counterclockwise.

Meanwhile, when a user pulls the manipulation tube 44 down, the tension spring 46 is stretched while the elastic energy of the tension spring 46 is accumulated as illustrated in FIG. 13(*a*).

When the curtain fabric 1 is lowered to a desired position by pulling the manipulation tube 44, a user releases the manipulation tube 44 which he or she pulls or slowly raises manipulation tube 44.

That is, while the tension spring 46 is being contracted as illustrated in FIG. 13(*b*) from a moment at which a user's pulling force is released, the manipulation tube 44 is returned to an initial position as illustrated in FIG. 12(*b*).

Here, while the manipulation tube 44 and the manipulation casing 41 are raised, the rear holder 42*b* is rotated toward the right side (the front) and slides on the rear cord 32.

That is, while the curtain fabric 1 is held, the manipulation tube 44 is returned, and when the manipulation tube 44 is pulled down again, the curtain fabric 1 is lowered as much as the manipulation tube 44 is pulled.

Accordingly, a user can lower the curtain fabric 1 up to the bottom of the window only by repeating the manipulation of pulling the manipulation tube 44.

For reference, the curtain fabric 1 is raised by pulling the manipulation tube 44 after turning the manipulation tube 44 leftward from the manipulation casing 41.

In the above, the exemplary embodiment of the present disclosure has been illustrated and described, but the present disclosure is not limited to the specific embodiment described above. Various modifications of the embodiment may be made by those of ordinary skill in the technical field to which the invention belongs without departing from the gist of the present disclosure claimed in the claims. These modified embodiments should not be individually understood from the technical spirit or prospect of the present disclosure.

What is claimed is:

1. A roller blind drive device preventing an accident due to a drive cord, the drive device being configured to lower or raise a curtain fabric by performing at least one of forward rotation and reverse rotation of a drum on which the curtain fabric is wound, the drive device comprising:

a fixed part disposed fixedly at a side of the drum;

a rotating part mounted rotatably to the fixed part and configured to perform the at least one of forward rotation and reverse rotation of the drum with which the curtain fabric is lowered or raised;

a drive cord; and a manipulating part, wherein, the drive cord comprises:

a front cord and a rear cord which are connected to the rotating part in an infinite loop with which the front and the rear cord rotate in a same direction and hang toward a lower side of the fixed part, the front cord and the rear cord are spaced apart from each other, and the manipulating part connected to the drive cord at the lower side of the fixed part, the manipulating part being configured to perform at least one of forward rotation and reverse rotation of the drive cord by selectively gripping the front cord or the rear cord according to rotating and pulling manipulations of the manipulating part performed by a user, wherein, the manipulating part comprises:

a manipulation cover disposed to cover the drive cord at the lower side of the fixed part, and receiving the front and rear cords of the drive cord, the front and rear cords are separated from each other in a front-to-rear direction and move upward and downward;

a holding member mounted to a center of the manipulation cover and slides forward and backward, the holding member being configured to press and hold the front and rear cords according to the forward and backward movements of the holding member, respectively;

a rotating member being rotatably mounted to a lower end of the manipulation cover and connected to the holding member, the rotating member moves the holding member forward and backward;

a manipulation tube mounted to a lower end of the rotating member configured to receive at least one of forward rotational force and reverse rotational force of the rotating member and downward movement force of the front and rear cords from a user through the drive cord;

a connecting member mounted in a center of the manipulation tube and connected to the drive cord in an infinite loop; and a tension spring being mounted to a center of a lower end of the manipulation tube and connected to the connecting member, the tension spring allows the drive cord to be maintained in predetermined tension by pulling the connecting member down and allowing the manipulation cover to return to a raised position adjacent to the fixed part, the manipulation cover comprises:

an inner cover disposed on one side of a lower part of the fixed part and, receiving the front and rear cords, the holding member, and the rotating member;

an outer cover mounted to the inner cover to cover the inner cover, the outer cover restricting the front and rear cords, the holding member, and the rotating member such that the front and rear cords, the holding member, and the rotating member are mounted in the inner cover;

a cover guide protruding on an upper end of each of the inner and outer covers, the cover guide configured to return to an original position by interfering with a lower end portion of the fixed part;

a plurality of separating protrusion parts on upper and lower ends of one surface of the inner cover by having predetermined lengths, the separating protrusion parts separating the front and rear cords from each other, the front and rear cords move upward and downward;

a guide rail protruding on a center of one surface of each of the inner and outer covers, the guide rail is horizontal in the front-to-rear direction, the guide rail supporting the holding member to slide forward and backward;

an elastic plate protruding on a center of the outer cover by being cut in a U shape, the elastic plate is bent leftward and rightward according to the sliding of the holding member;

a hold protrusion part protruding on a center of one surface of the elastic plate by having a cone shape, the manipulation cover is engaged with the holding member so as to hold the holding member at a position to which the holding member slides;

a rotation groove part recessed in a lower end of one surface of each of the inner and outer covers by being stepped in a semicircular shape, the rotation groove part being configured to restrict the rotating member; and a hold groove part recessed in a lower end of one surface of each of the inner and outer covers by being stepped in an arc shape, the hold groove part is configured to interfere with the rotating member limiting a rotation range of the rotating member.

2. The drive device of claim 1, wherein the fixed part comprises:

a fixed casing having an inner diameter to receive the rotating part and having a path provided on a lower end of the fixed casing by having a predetermined size with which the drive cord is connected to the rotating part and the manipulating part, and a fixed shaft being inserted into and mounted to a center of the fixed casing and supporting the rotating part.

3. The drive device of claim 2, wherein the fixed casing comprises:

a cord guide protruding on each of front and rear sides of the lower end of the fixed casing by having a predetermined length such that the drive cord connected to the rotating part is aligned with the manipulating part, and a manipulation guide connected to and protruding on one side of the cord guide in the front-to-rear direction such that the manipulating part is returned to an original position.

4. The drive device of claim 1, wherein the rotating part comprises:

a rotating wheel being rotatably mounted inside the fixed part and connected with the drive cord, the rotating wheel receives at least one of forward rotation and reverse rotational force therefrom, and a drum holder being mounted to the rotating wheel by being engaged therewith, and inserted into a center of one side of the drum to perform the at least one of forward rotation and reverse rotation of the drum.

5. The drive device of claim 1, wherein the holding member comprises:

a holding block being mounted to a first side of an inside of the manipulation cover so as to slide forward and backward, the holding block being configured to be connected to the rotating member so as to receive forward and backward movement force therefrom;

a rear holder being mounted to a center of an upper end of the holding block so as to be rotated forward and backward, the rear holder being configured to press the rear cord so as to slant the rear cord downward according to backward movement of the holding block such that the rear cord is held to perform only downward movement;

a front holder being mounted to the center of the upper end of the holding block so as to be rotated forward and backward, the front holder being configured to press the front cord so as to slant the front cord downward according to forward movement of the holding block such that the front cord is held to perform only downward movement;

a compression spring provided between the front and rear holders and configured to apply predetermined elastic force to each of the front and rear holders such that each of the front and rear holders is rotated outward; and a holding cover being mounted on a second side of the inside of the manipulation cover so as to slide forward and backward, the holding cover covering the holding block so as to prevent removal of each of the front and rear holders.

6. The drive device of claim 5, wherein the holding block comprises:

a connection groove part being cut through a center of a lower end of the holding block by having a predetermined size, the connection groove part is connected to the rotating member and receives forward and backward movement force therefrom;

a rotation pin inserted into and mounted to or protruding integrally from an upper end of a first surface of the holding block, the front and rear holders are rotatably mounted on the rotation pin while overlapping each other;

a cover groove part being recessed horizontally in the front-to-rear direction in a lower end of the first surface of the holding block with which the holding block and the holding cover together move forward and backward by being engaged with each other;

a plurality of holder protrusion parts protruding on the upper end of the first surface of the holding block by having depths to receive the front and rear holders such that the holder protrusion parts interfere with the front and rear holders so as to limit outward rotating ranges thereof;

a block rail groove part being recessed horizontally in the front-to-rear direction in a center of a second surface of the holding block such that the holding block slides forward and backward by being engaged with the manipulation cover; and a plurality of holding groove parts being arranged in a lower end of the second surface of the holding block by being recessed at predetermined intervals therefrom with which the holding block is engaged with the manipulation cover so as to be held at a position to which the holding block slides.

7. The drive device of claim 5, wherein the front and rear holders comprises:

a plurality of holder rotation holes formed respectively through centers of upper ends of the rear and front holders by having predetermined diameters, respectively, the front and rear holders are mounted to an upper end of the holding block and are configured to rotate forward and backward directions;

a plurality of spring protrusion parts protruding respectively on lower ends of surfaces of the rear and front holders facing each other by having predetermined sizes, respectively, the spring protrusion parts are inserted into the compression spring receive outward rotating forces therefrom; and a plurality of holder blades respectively protruding slantingly on lower ends of the rear and front holders by having V shapes with which such that the holder blades press the rear and front cords by being in linear contact therewith so as to hold the rear and front cords.

8. The drive device of claim 6, wherein the holding cover comprises:

a pin hole part being recessed in an upper end of a first surface of the holding cover by having a depth to receive the rotation pin such that each of the front and rear holders is rotatably mounted on the rotation pin while overlapping each other;

a cover protrusion part protruding on a lower end of the first surface of the holding cover by having a size to be engaged with the cover groove part such that the cover protrusion part is inserted into the cover groove part configured to move together with the cover groove part; and a cover rail groove part being recessed horizontally in the front-to-rear direction in a center of a second surface of the holding cover such that the cover rail groove part is engaged with the manipulation cover so as to slide the holding cover forward and backward.

9. The drive device of claim 1, wherein the rotating member comprises:

a rotating body having an outer diameter to be mounted inside the manipulation cover and having an inner diameter to receive the drive cord;

a rotation boss protruding outward on each of upper and lower ends of the rotating body by having a predetermined diameter, the rotation boss being engaged with and holding the manipulation cover such that the rotating member is rotatable;

a holding protrusion part protruding on one side of an outer surface of the rotating body by having a predetermined size, the holding protrusion part being configured to interfere with the manipulation cover such that a rotation range of the rotating body is limited;

a connection boss protruding on the lower end of the rotating body by having a predetermined shape, the connection boss being configured to be inserted into the manipulation tube configured to receive the at least one of forward rotational force and reverse rotational force and the downward movement force from a user; and a crankshaft protruding on one side of an upper end of the rotating body by having a predetermined length, the crankshaft is connected to the holding member with which the rotational movement is changed into forward and/or backward rectilinear movement.

10. The drive device of claim 1, wherein the manipulation tube comprises:

an inner tube mounted to a first side of the lower end of the rotating member configured to cover the first side thereof and receives the front and rear cords, the connecting member, and the tension spring;

an outer tube mounted to a second side of the lower end of the rotating member configured to cover the second side thereof and restricts the front and rear cords, the connecting member, and the tension spring; and a spring cap being inserted and mounted into a center portion between the lower ends of the inner and outer tubes, the spring cap being connected to a lower end of the tension spring such that the drive cord is held to be pulled.

11. A roller blind drive device preventing an accident due to a drive cord, the drive device being configured to lower or raise a curtain fabric by performing at least one of forward rotation and reverse rotation of a drum on which the curtain fabric is wound, the drive device comprising:

a fixed part disposed fixedly at a side of the drum;

a rotating part mounted rotatably to the fixed part and configured to perform the at least one of forward rotation and reverse rotation of the drum with which the curtain fabric is lowered or raised;

a drive cord; and a manipulating part, wherein, the drive cord comprises:

a front cord and a rear cord which are connected to the rotating part in an infinite loop with which the front and the rear cord rotate in a same direction and hang toward a lower side of the fixed part, the front cord and the rear cord are spaced apart from each other, and the manipulating part connected to the drive cord at the lower side of the fixed part, the manipulating part being configured to perform at least one of forward rotation and reverse rotation of the drive cord by selectively gripping the front cord or the rear cord according to rotating and pulling manipulations of the manipulating part performed by a user, wherein, the manipulating part comprises:

a manipulation cover disposed to cover the drive cord at the lower side of the fixed part, and receiving the front and rear cords of the drive cord, the front and rear cords are separated from each other in a front-to-rear direction and move upward and downward;

a holding member mounted to a center of the manipulation cover and slides forward and backward, the holding member being configured to press and hold the front and rear cords according to the forward and backward movements of the holding member, respectively;

a rotating member being rotatably mounted to a lower end of the manipulation cover and connected to the holding member, the rotating member moves the holding member forward and backward;

a manipulation tube mounted to a lower end of the rotating member configured to receive at least one of forward rotational force and reverse rotational force of the rotating member and downward movement force of the front and rear cords from a user through the drive cord;

a connecting member mounted in a center of the manipulation tube and connected to the drive cord in an infinite loop; and a tension spring being mounted to a center of a lower end of the manipulation tube and connected to the connecting member, the tension spring allows the drive cord to be maintained in predetermined tension by pulling the connecting member down and allowing the manipulation cover to return to a raised position adjacent to the fixed part, wherein the holding member comprises:

a holding block being mounted to a first side of an inside of the manipulation cover and slides forward and backward, the holding block is connected to the rotating member and receives forward and backward movement force therefrom;

a rear holder being mounted to a center of an upper end of the holding block, and rotates forward and backward, the rear holder is configured to press the rear cord to slant the rear cord downward in backward movement of the holding block, the rear cord is held to perform only downward movement;

a front holder being mounted to the center of the upper end of the holding block and rotates forward and backward, the front holder being configured to press the front cord to slant the front cord downward according to forward movement of the holding block, the front cord is held to perform only downward movement;

a compression spring provided between the front and rear holders and configured to apply predetermined elastic force to each of the front and rear holders, each of the front and rear holders is rotated outward; and a holding cover being mounted on a second side of the inside of the manipulation cover configured to slide forward and backward, the holding cover covering the holding block prevents removal of each of the front and rear holders, wherein the holding block further comprises:

a connection groove part being cut through a center of a lower end of the holding block by having a predetermined size, the connection groove part is connected to the rotating member and receives forward and backward movement force therefrom;

a rotation pin inserted into and mounted to or protruding integrally from an upper end of a first surface of the holding block, the front and rear holders are rotatably mounted on the rotation pin while overlapping each other;

a cover groove part being recessed horizontally in the front-to-rear direction in a lower end of the first surface of the holding block with which the holding block and the holding cover together move forward and backward by being engaged with each other;

a plurality of holder protrusion parts protruding on the upper end of the first surface of the holding block by having depths to receive the front and rear holders such that the holder protrusion parts interfere with the front and rear holders so as to limit outward rotating ranges thereof;

a block rail groove part being recessed horizontally in the front-to-rear direction in a center of a second surface of the holding block such that the holding block slides forward and backward by being engaged with the manipulation cover; and a plurality of holding groove parts being arranged in a lower end of the second surface of the holding block by being recessed at predetermined intervals therefrom with which the holding block is engaged with the manipulation cover so as to be held at a position to which the holding block slides.

12. A roller blind drive device preventing an accident due to a drive cord, the drive device being configured to lower or raise a curtain fabric by performing at least one of forward rotation and reverse rotation of a drum on which the curtain fabric is wound, the drive device comprising:

a fixed part disposed fixedly at a side of the drum;

a rotating part mounted rotatably to the fixed part and configured to perform the at least one of forward rotation and reverse rotation of the drum with which the curtain fabric is lowered or raised;

a drive cord; and a manipulating part, wherein, the drive cord comprises:

a front cord and a rear cord which are connected to the rotating part in an infinite loop with which the front and the rear cord rotate in a same direction; and hang toward a lower side of the fixed part, the front cord and the rear cord are spaced apart from each other, and the manipulating part connected to the drive cord at the lower side of the fixed part, the manipulating part being configured to perform at least one of forward rotation and reverse rotation of the drive cord by selectively gripping the front cord or the rear cord according to rotating and pulling manipulations of the manipulating part performed by a user, wherein, the manipulating part comprises:

a manipulation cover disposed to cover the drive cord at the lower side of the fixed part, and receiving the front and rear cords of the drive cord, the front and rear cords are separated from each other in a front-to-rear direction and move upward and downward;

a holding member mounted to a center of the manipulation cover and slides forward and backward, the holding member being configured to press and hold the front and rear cords according to the forward and backward movements of the holding member, respectively;

a rotating member being rotatably mounted to a lower end of the manipulation cover and connected to the holding member, the rotating member moves the holding member forward and backward;

a manipulation tube mounted to a lower end of the rotating member configured to receive at least one of forward rotational force and reverse rotational force of the rotating member and downward movement force of the front and rear cords from a user through the drive cord;

a connecting member mounted in a center of the manipulation tube and connected to the drive cord in an infinite loop; and a tension spring being mounted to a center of a lower end of the manipulation tube and connected to the connecting member, the tension spring allows the drive cord to be maintained in predetermined tension by pulling the connecting member down and allowing the manipulation cover to return to a raised position adjacent to the fixed part, wherein the holding member comprises:

a holding block being mounted to a first side of an inside of the manipulation cover so as to slide forward and backward, the holding block being configured to be connected to the rotating member so as to receive forward and backward movement force therefrom;

a rear holder being mounted to a center of an upper end of the holding block so as to be rotated forward and backward, the rear holder being configured to press the rear cord so as to slant the rear cord downward according to backward movement of the holding block such that the rear cord is held to perform only downward movement;

a front holder being mounted to the center of the upper end of the holding block so as to be rotated forward and backward, the front holder being configured to press the front cord so as to slant the front cord downward according to forward movement of the holding block such that the front cord is held to perform only downward movement;

a compression spring provided between the front and rear holders and configured to apply predetermined elastic force to each of the front and rear holders such that each of the front and rear holders is rotated outward; and a holding cover being mounted on a second side of the inside of the manipulation cover so as to slide forward and backward, the holding cover covering the holding block so as to prevent removal of each of the front and rear holders, wherein the front and rear holders comprise:

a plurality of holder rotation holes formed respectively through centers of upper ends of the rear and front holders by having predetermined diameters, respectively, the front and rear holders are mounted to an upper end of the holding block configured to rotate forward and backward directions;

a plurality of spring protrusion parts protruding respectively on lower ends of surfaces of the rear and front holders facing each other by having predetermined sizes, respectively, the spring protrusion parts are inserted into the compression spring receive outward rotating forces therefrom; and a plurality of holder blades respectively protruding slantingly on lower ends of the rear and front holders by having V shapes with which the holder blades press the rear and front cords by being in linear contact therewith so as to hold the rear and front cords.

* * * * *